(12) United States Patent
Li et al.

(10) Patent No.: US 11,489,342 B2
(45) Date of Patent: Nov. 1, 2022

(54) SELECTING CHARGING PARAMETER FOR COMPONENT IN CHARGING SYSTEM

(71) Applicant: Huawei Technologies Co., Ltd., Shenzhen (CN)

(72) Inventors: Chuangwei Li, Shanghai (CN); Ke Ai, Shenzhen (CN); Tongjie Li, Shenzhen (CN); Jianzhong Zou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 72 days.

(21) Appl. No.: 17/040,778

(22) PCT Filed: Mar. 26, 2018

(86) PCT No.: PCT/CN2018/080554
§ 371 (c)(1),
(2) Date: Sep. 23, 2020

(87) PCT Pub. No.: WO2019/183774
PCT Pub. Date: Oct. 3, 2019

(65) Prior Publication Data
US 2021/0006080 A1    Jan. 7, 2021

(51) Int. Cl.
*H02J 7/00* (2006.01)
(52) U.S. Cl.
CPC ...... *H02J 7/00032* (2020.01); *H02J 7/00712* (2020.01)
(58) Field of Classification Search
CPC .................................................. H02J 7/00032
USPC ....................................................... 320/137
See application file for complete search history.

(56) References Cited

U.S. PATENT DOCUMENTS

| 2007/0184805 | A1 | 8/2007 | Zhu et al. |
| 2012/0249449 | A1* | 10/2012 | Tseng ............... H04B 5/0037 345/173 |
| 2014/0103865 | A1* | 4/2014 | Van Wiemeersch ........ H04B 5/0037 320/155 |
| 2015/0123621 | A1* | 5/2015 | Kim ............... H02J 7/00712 320/137 |

(Continued)

FOREIGN PATENT DOCUMENTS

| CN | 103730919 A | 4/2014 |
| CN | 104158235 A | 11/2014 |

(Continued)

*Primary Examiner* — Yalkew Fantu
(74) *Attorney, Agent, or Firm* — Conley Rose, P.C.

(57) ABSTRACT

A charging method includes obtaining, by a charging device, a working status of a sensitive component in a terminal device, where the sensitive component interferes with a process in which the charging device charges the terminal device at a sensitive frequency, and the sensitive frequency is within a range of a charging frequency band of the charging device, determining, by the charging device, a safe charging parameter when the working status is an enabled state, where the safe charging parameter includes at least one of a safe charging frequency, a safe charging current, or a safe charging voltage, and charging, by the charging device, the terminal device using the safe charging parameter, where the sensitive component operates in a normal state when the wireless charging device charges the terminal device using the safe charging parameter.

20 Claims, 5 Drawing Sheets

(56) References Cited

U.S. PATENT DOCUMENTS

2015/0326062 A1* 11/2015 Gonzalez Valdez .... H02J 7/042
                                                               320/108
2015/0340904 A1    11/2015  Munson et al.
2017/0025887 A1    1/2017  Hyun et al.

FOREIGN PATENT DOCUMENTS

| CN | 105098937 A | 11/2015 |
|---|---|---|
| CN | 106130193 A | 11/2016 |
| CN | 106208397 A | 12/2016 |
| CN | 106549455 A | 3/2017 |
| CN | 107728847 A | 2/2018 |
| EP | 2302756 A1 | 3/2011 |
| EP | 2367262 A2 | 9/2011 |
| EP | 2573949 A2 | 3/2013 |
| KR | 20170011507 A | 2/2017 |

\* cited by examiner

SELECTING CHARGING PARAMETER FOR COMPONENT IN CHARGING SYSTEM

CROSS-REFERENCE TO RELATED APPLICATIONS

This application is a U.S. National Stage of International Patent Application No. PCT/CN2018/080554 filed on Mar. 26, 2018, which is hereby incorporated by reference in its entirety.

TECHNICAL FIELD

This application relates to the field of charging technologies, and in particular, to a charging method and device.

BACKGROUND

Nowadays, terminal devices, such as smartphones and tablet computers, are increasingly widely used. In addition, current terminal devices all use rechargeable batteries, which can be charged cyclically for use. This greatly facilitates people's life.

However, in an existing charging manner, regardless of a wired charging manner or a wireless charging manner, a generated charging signal may be coupled to a module component in a terminal device (the module component may be a component or a part of one or more functional modules in the terminal device), for example, a display module (liquid crystal display (Liquid Crystal Display, LCD)), a touch module (touch panel (Touch Panel, TP)), a camera module, a fingerprint module, and the like. When the terminal device is charged in the wired charging manner, a charging signal generated by a charging device (for example, a wired charger) is coupled to a module component in a conduction manner. When the terminal device is charged in the wireless charging manner, a charging signal generated by a charging device (for example, a wireless charging device) is spatially coupled to a module component.

Consequently, when a frequency of the charging signal coincides with (or is close to) an operating frequency (or harmonic) of the module component, an abnormality may occur when the module component operates. For example, touch sensitivity of the TP is decreased, a color stripe or a ripple appears on the camera module, or an unlocking success rate of the fingerprint module is decreased. This affects user experience.

SUMMARY

Embodiments of this application provide a charging method and device, to reduce interference generated on a module component in a terminal device in a process in which the charging device charges the terminal device.

According to a first aspect, an embodiment of this application provides a charging method, including: obtaining, by a charging device, a working status of a sensitive module component in a terminal device, where the sensitive module component is a module component that is interfered with in a process in which the charging device charges the terminal device at a sensitive frequency, and the sensitive frequency is within a range of a charging frequency band of the charging device; when the working status is an enabled state, determining, by the charging device, a safe charging parameter, where the safe charging parameter includes at least one of a safe charging frequency, a safe charging current, and a safe charging voltage; and charging, by the charging device, the terminal device by using the safe charging parameter, where in a process in which the wireless charging device charges the terminal device by using the safe charging parameter, the sensitive module component operates normally.

In this embodiment of this application, when the working status of the sensitive module component is the enabled state, the charging device charges the terminal device by using the determined safe charging parameter. In the process in which the charging device charges the terminal device by using the safe charging parameter, the sensitive module component operates normally. In other words, in the process in which the charging device charges the terminal device by using the safe charging parameter, interference caused by the charging device to the sensitive module component in the terminal device can be reduced.

In a possible design, the determining, by the charging device, a safe charging parameter includes: selecting, by the charging device, a frequency other than the obtained sensitive frequency from the charging frequency band as the safe charging frequency; and determining, by the charging device, the safe charging voltage or the safe charging current based on a pre-stored first mapping relationship, where the first mapping relationship includes a correspondence between the sensitive module component and at least one of the safe charging voltage and the safe charging current when the sensitive component is in an enabled state.

In this embodiment of this application, the sensitive module component may be classified into two types: a type of sensitive module component that can obtain an operating frequency of the sensitive module component and a type of sensitive module component that cannot obtain an operating frequency of the sensitive module component. When the sensitive module component is the type of sensitive module component that can obtain an operating frequency of the sensitive module component, the charging device selects, from the charging frequency band, the frequency other than the obtained sensitive frequency as the safe charging frequency, and then determines the safe charging voltage or the safe charging current based on the first mapping relationship. Herein, the sensitive frequency is the operating frequency.

In this embodiment of this application, the safe charging voltage or the safe charging current may be alternatively obtained by the charging device from the terminal device.

In a possible design, the determining, by the charging device, a safe charging parameter includes: determining, by the charging device based on a pre-stored second mapping relationship, a safe charging frequency, a safe charging voltage, or a safe charging current that corresponds to the sensitive module component, where the second mapping relationship includes a correspondence between the sensitive module component and at least one of the safe charging frequency, the safe charging voltage, and the safe charging current when the sensitive component is in an enabled state.

In this embodiment of this application, the charging device may directly determine the safe charging frequency, the safe charging voltage, or the safe charging current based on the second mapping relationship. Certainly, the charging device may alternatively obtain, from the terminal device, the safe charging frequency, the safe charging voltage, or the safe charging current that corresponds to the sensitive module component.

In this embodiment of this application, the charging device may alternatively obtain, from the terminal device, the sensitive frequency, a charging voltage of the terminal device, and/or a charging current of the terminal device. The charging device selects, from the charging frequency band, the frequency other than the obtained sensitive frequency as the safe charging frequency, converts the charging voltage of the terminal device into the safe charging voltage, and converts the charging current of the terminal device into the safe charging current.

In a possible design, when there are a plurality of sensitive module components in an enabled state, the method further includes: determining an intermediate frequency of safe charging frequencies corresponding to the plurality of sensitive module components as the safe charging frequency; determining a minimum charging voltage in safe charging voltages corresponding to the plurality of sensitive module components as the safe charging voltage; or determining a minimum charging current in safe charging currents corresponding to the plurality of sensitive module components as the safe charging voltage.

In this embodiment of this application, when there are the plurality of sensitive module components in the enabled state, to reduce interference to the plurality of sensitive module components in the enabled state, the charging device determines the intermediate frequency in the safe charging frequencies of the plurality of sensitive module components as the safe charging frequency, determines the minimum charging voltage in the safe charging voltages of the plurality of sensitive module components as the safe charging voltage, and determines the minimum charging current in the safe charging currents of the plurality of sensitive module components as the safe charging current.

According to a second aspect, an embodiment of this application provides a charging method, including: obtaining, by the sensitive module component, a working status of the sensitive module component; sending, by the sensitive module component, the working status to the charging module, where the sensitive module component is a module component that is interfered with in a process in which a charging device charges the terminal device at a sensitive frequency, and the sensitive frequency is within a range of a charging frequency band of the charging device; when the working status is an enabled state, determining, by the charging module, a safe charging parameter, where the safe charging parameter includes at least one of a safe charging frequency, a safe charging current, and a safe charging voltage; and sending, by the charging module, the safe charging parameter to the charging device, so that the charging device charges the terminal device by using the safe charging parameter, where in a process in which the charging device charges the terminal device by using the safe charging parameter, the sensitive module component operates normally.

In a possible design, when the sensitive module component can obtain an operating frequency of the sensitive module component, the method further includes: obtaining, by the sensitive module component, the operating frequency of the sensitive module component, where the operating frequency is the sensitive frequency; and sending, by the sensitive module component, the obtained operating frequency to the charging module; and the determining, by the charging module, a safe charging parameter includes: selecting, by the charging module, a frequency other than the obtained operating frequency from the charging frequency band as the safe charging frequency; and determining, by the charging module, the safe charging voltage or the safe charging current based on a pre-stored first mapping relationship, where the first mapping relationship includes a correspondence between the sensitive module component and at least one of the safe charging voltage and the safe charging current when the sensitive component is in an enabled state.

In a possible design, the determining, by the charging module, a safe charging parameter includes: determining, by the charging module based on a pre-stored second mapping relationship, a safe charging frequency, a safe charging voltage, or a safe charging current that corresponds to the sensitive module component, where the second mapping relationship includes a correspondence between the sensitive module component and at least one of the safe charging frequency, the safe charging voltage, and the safe charging current when the sensitive component is in an enabled state.

In a possible design, when there are a plurality of sensitive module components in an enabled state, the method further includes: determining an intermediate frequency of safe charging frequencies corresponding to the plurality of sensitive module components as the safe charging frequency; determining a minimum charging voltage in safe charging voltages corresponding to the plurality of sensitive module components as the safe charging voltage; or determining a minimum charging current in safe charging currents corresponding to the plurality of sensitive module components as the safe charging voltage.

In a possible design, the sending, by the sensitive module component, the working status to the charging module includes: directly sending, by the sensitive module component, the working status to the charging module; or writing, by the sensitive module component, the working status into a node file, where the charging module obtains the working status from the node file.

According to a third aspect, an embodiment of this application provides a charging device. The charging device has a function of implementing behavior of the charging device in the method in the first aspect. The function may be implemented by hardware, or may be implemented by hardware executing corresponding software. The hardware or the software includes one or more modules corresponding to the foregoing function.

In a possible design, a structure of the charging device includes a communications interface, a memory, and a processor. The processor is configured to support the charging device in performing a corresponding function in the method in the first aspect. The memory is coupled to the processor, and the memory stores a necessary instruction and necessary data.

According to a fourth aspect, an embodiment of this application provides a terminal device. The terminal device has a function of implementing behavior of the terminal device in the method in the second aspect. The function may be implemented by hardware, or may be implemented by hardware executing corresponding software. The hardware or the software includes one or more modules corresponding to the foregoing function.

In a possible design, a structure of the terminal device includes a charging module and a sensitive module component. The charging module and the sensitive module component are configured to support the terminal device in performing a corresponding function in the method in the second aspect.

According to a fifth aspect, an embodiment of this application provides a computer storage medium. The computer storage medium stores computer software instructions used to perform the function in any one of the first aspect and the designs of the first aspect, and the function in any one of the second aspect and the designs of the second aspect, or includes programs used to perform the method in any one of the first aspect and the designs of the first aspect, and the method in any one of the second aspect and the designs of the second aspect.

According to a sixth aspect, an embodiment of this application provides a computer program product. When the program product is invoked and executed by a computer, the computer may be enabled to perform the method in any one of the first aspect and the designs of the first aspect, and the method in any one of the second aspect and the designs of the second aspect.

According to a seventh aspect, an embodiment of this application provides a chip system. The chip system includes a processor, configured to support a charging device and a terminal device in implementing the method in the first aspect and the second aspect, for example, generating or processing data and/or information in the method in the first aspect and the second aspect. In a possible design, the chip system further includes a memory. The memory is configured to store a program instruction and data that are necessary for the charging device and the terminal device. The processor in the chip system may invoke the program instruction and the data stored in the memory in the chip system, so that the chip system can implement functions that can be implemented by the charging device and the terminal device. The chip system may include a chip, or may include a chip and another discrete device.

For beneficial effects of the second aspect to the seventh aspect and the implementations of the second aspect to the seventh aspect, refer to descriptions of beneficial effects of the method in the first aspect and the implementations of the first aspect.

DESCRIPTION OF EMBODIMENTS

Figure 1:
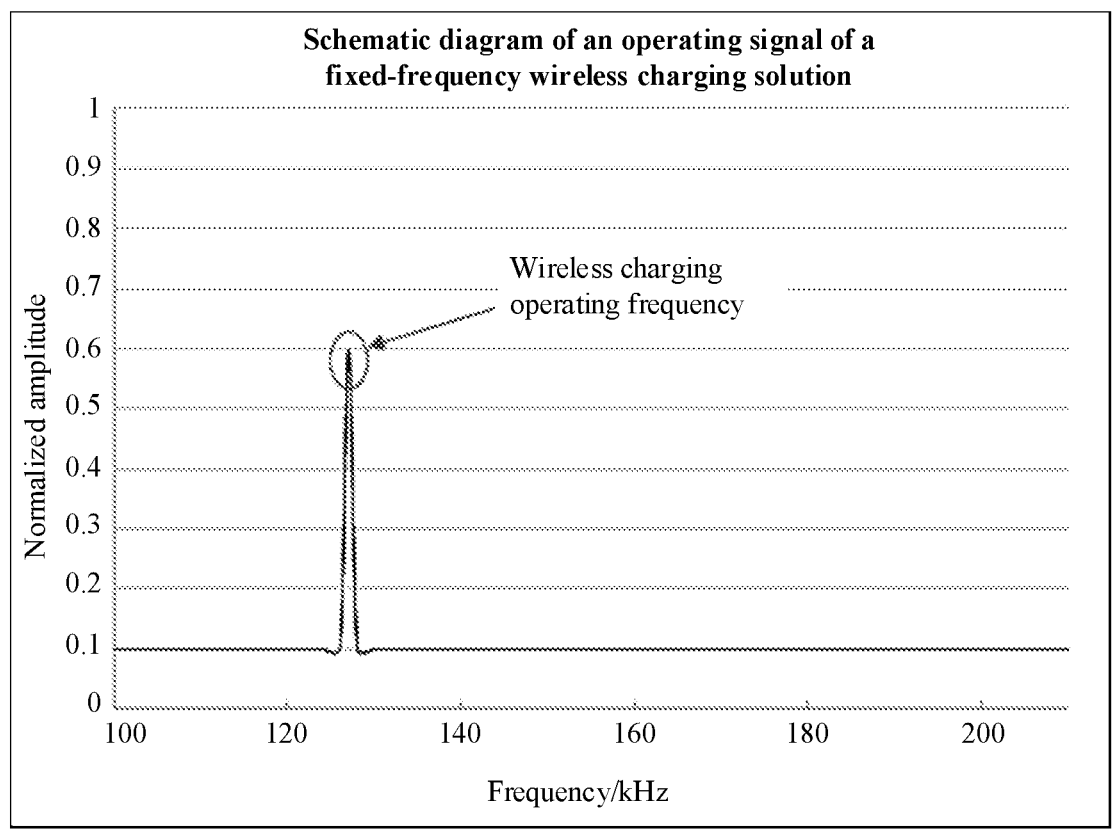
FIG. 1 is a schematic diagram of frequency domain when a wireless charging device using a fixed-frequency wireless charging solution operates in the prior art.

In the following, some terms of the embodiments of this application are described, so as to help a person skilled in the art has a better understanding.

(1) A terminal device may be a device that provides a user with voice and/or data connectivity, for example, may be a handheld device with a wireless connection function, or a processing device connected to a wireless modem. The terminal device may communicate with a core network through a radio access network (Radio Access Network, RAN), and exchange a voice and/or data with the RAN. The terminal device may be referred to as user equipment (User Equipment, UE), a wireless terminal device, a mobile terminal device, a subscriber unit (Subscriber Unit), a subscriber station (Subscriber Station), a mobile station (Mobile Station), a mobile console (Mobile), a remote station (Remote Station), an access point (Access Point, AP), a remote terminal (Remote Terminal), an access terminal (Access Terminal), a user terminal device (User Terminal), a user agent (User Agent), a user device (User Device), or the like. For example, the terminal device may include a mobile phone (or referred to as a "cellular" phone), a computer with a mobile terminal device, a portable, pocket-sized, handheld, computer built-in, or in-vehicle mobile apparatus, an intelligent wearable device, or the like. For example, it may be a device such as a personal communications service (Personal Communication Service, PCS) phone, a cordless telephone set, a session initiation protocol (SIP) phone, a wireless local loop (Wireless Local Loop, WLL) station, or a personal digital assistant (Personal Digital Assistant, PDA), a smartwatch, a smart helmet, smart glasses, or a smart band. The terminal device further includes a restricted device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

(2) Wireless charging standards: Currently, mainstream wireless charging standards include a PMA standard released by the Power Matters Alliance (Power Matters Alliance, PMA), a Qi standard released by the Wireless Power Consortium (Wireless Power Consortium, WPC), and an A4WP standard released by the Alliance for Wireless Power (Alliance for Wireless Power, A4wP)). Using the Qi standard as an example, an operating frequency of wireless charging based on the Qi standard is 110 kilohertz (KHz) to 205 kHz. Each vendor selects a frequency or a frequency band from the frequency band 110 kHz to 205 kHz as a wireless charging frequency based on a requirement of each vendor.

(3) In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects, if without special explanation. In addition, in the description of the embodiments of the present invention, words such as "first" and "second" are merely used for distinction and description, and shall not be understood as an indication or implication of relative importance or an indication or implication of an order.

To make the objectives, technical solutions, and advantages of this application clearer, the following further describes this application in detail with reference to the accompanying drawings.

In a process in which a wireless charging device charges the terminal device, to ensure charging stability, charging power of the wireless charging device needs to be adjusted. For example, when being located at different locations on the wireless charging device, the terminal device requires different charging powers. In an example, when a center location of the terminal device coincides with that of the wireless charging device, relatively small charging power can meet a charging requirement of the terminal device. When the center location of the terminal device deviates from that of the wireless charging device, only relatively high charging power can meet a charging requirement of the terminal device. In addition, the terminal device requires different charging powers in different charging phases. In an example, when a battery level of the terminal device is relatively low, for example, the battery level remains at 10%, only relatively high charging power can meet a charging requirement of the terminal device. When the battery level of the terminal device is relatively high, for example, the battery level remains at 90%, relatively low charging power can meet a charging requirement of the terminal device. The following provides current main wireless charging solutions and a manner of adjusting charging power in each wireless charging solution.

1. Wireless charging solution based on a fixed frequency

In this wireless charging solution, an operating frequency of the wireless charging device may be a fixed frequency. FIG. 1 is a schematic diagram of frequency domain when a wireless charging device using a fixed-frequency wireless charging solution operates. In the wireless charging solution, because the operating frequency of the wireless charging device is fixed, a charging module in the wireless charging device adjusts the charging power of the wireless charging device by using a transformer, for example, adjusts a charging voltage and/or a charging current of the wireless charging device by using the transformer.

2. Wireless charging solution based on frequency sweeping

Figure 2:
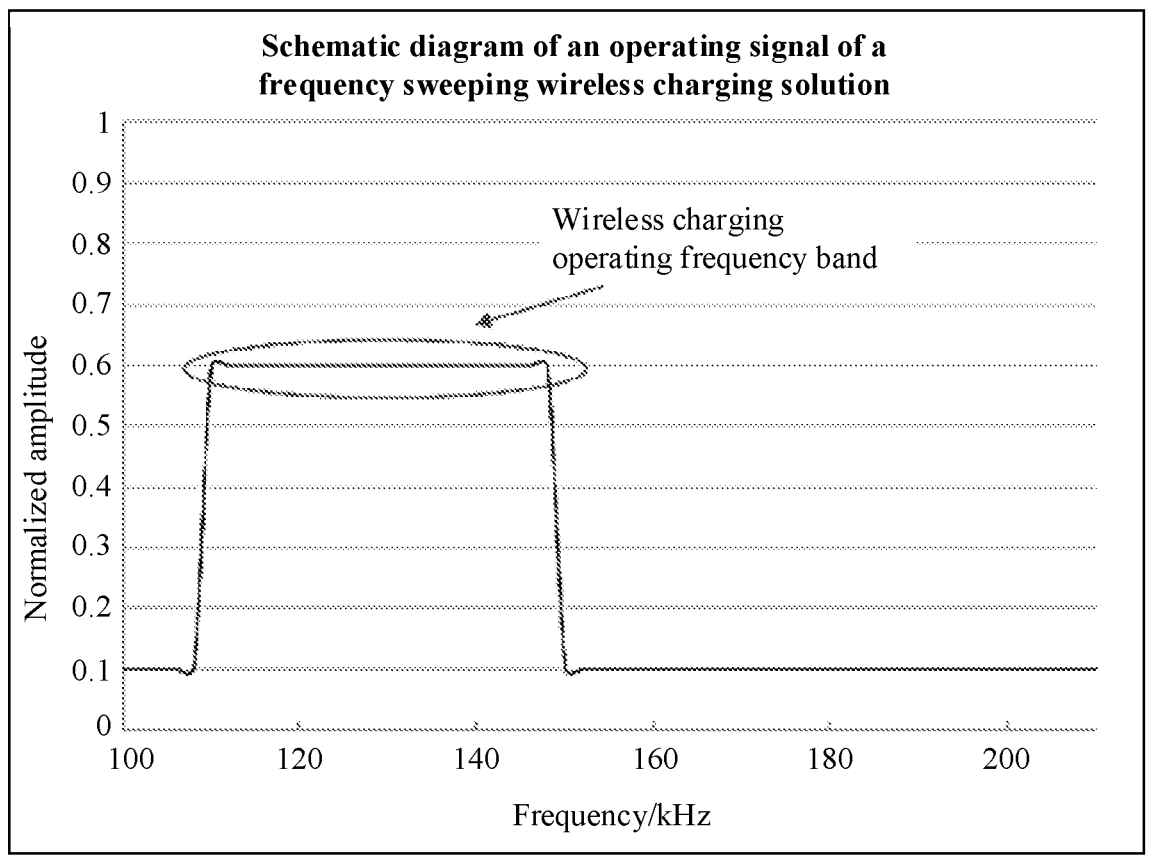
FIG. 2 is a schematic diagram of frequency domain when a wireless charging device using a frequency sweeping wireless charging solution operates in the prior art.

In this wireless charging solution, an operating frequency of the wireless charging device is not fixed, in other words, the operating frequency of the wireless charging device changes within a frequency band. For example, a frequency F1 in the frequency band is used for charging in first 10 minutes during charging, a frequency F2 in the frequency band is used for charging in next 40 minutes during charging, and a frequency F3 in the frequency band is used for charging in last 10 minutes during charging. FIG. 2 is a schematic diagram of frequency domain when a wireless charging device using the frequency sweeping wireless charging solution operates. In the wireless charging solution, a charging module of the wireless charging device can adjust the operating frequency of the wireless charging device, so as to adjust the charging power of the wireless charging device.

Both the wireless charging solution 1 and the wireless charging solution 2 have advantages and disadvantages. For example, in the wireless charging solution 1, the operating frequency of the wireless charging device remains stable, so that interference to a module component in the terminal device can be avoided. However, because the transformer is added, manufacturing costs of the wireless charging device and a size of the wireless charging device are increased. In the wireless charging solution 2, no transformer is used, so that the manufacturing costs of the wireless charging device and the size of the wireless charging device are reduced. However, because the operating frequency of the wireless charging device changes within the frequency band, when an operating frequency or a frequency multiplication of the module component in the terminal device coincides with or approaches at least one frequency in the frequency band, the module component is easily interfered with.

Technical solutions provided in this application may be applied to a wired charging scenario or a wireless charging scenario, and are preferably applied to the wireless charging scenario.

Figure 3:
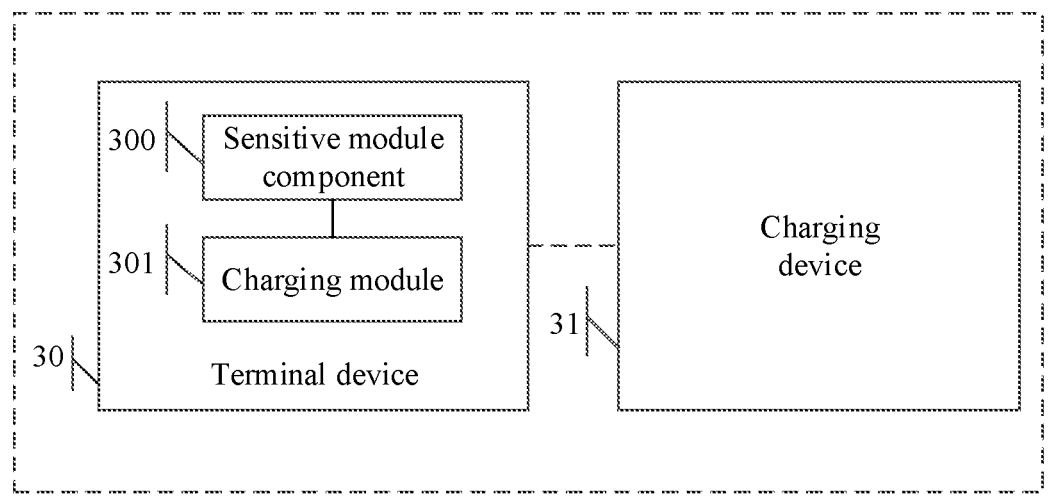
FIG. 3 is a schematic diagram of an application scenario according to an embodiment of this application.

FIG. 3 is a system architecture diagram of a charging system according to an embodiment of this application. In FIG. 3, a terminal device 30 and a charging device 31 are included.

The charging device 31 may be a wired charging device, or may be a wireless charging device. In FIG. 3, the terminal device 30 and the charging device 31 are connected through a dashed line, indicating that the terminal device 30 and the charging device 31 are connected in a wireless manner. In FIG. 3, the terminal device 30 and the charging device 31 may be alternatively connected by using a solid line (not shown in the figure), indicating that the terminal device 30 and the charging device 31 are connected in a wired manner.

Herein, that the charging device 31 is a wireless charging device is used as an example. The wireless charging device charges the terminal device 30 only when determining that the terminal device 30 is already in a wireless charging area of the wireless charging device and identity identification succeeds. Herein, the wireless charging device may specifically determine, by using a sensor or a wireless communications module configured in the wireless charging device, whether the terminal device 30 is located in the wireless charging area. For example, an infrared sensor is used to detect whether the terminal device 30 is placed in the wireless charging area. Alternatively, a distance between an ultrasonic transmitter and a receive end is compared by using an ultrasonic sensor, to determine whether the terminal device 30 is placed in the wireless charging area. A process in which the wireless charging device performs identity identification may be as follows: When detecting that the terminal device 30 is already in the wireless charging area, the wireless charging device sends, to the terminal device 30, an instruction for requesting an identification number, After receiving and parsing the instruction, the terminal device 30 sends a feedback instruction to the wireless charging device. The wireless charging device receives and parses the feedback instruction. If an identification number carried in the feedback instruction is the same as an identification number stored in the wireless charging device, it indicates that an identity of the terminal device 30 is authorized.

The terminal device 30 includes a sensitive module component 300 and a charging module 301. Certainly, the terminal device 30 may further include another component or module. Examples are not given one by one herein. The charging module 301 may actively or passively obtain related information of the sensitive module component 300, for example, a working status of the sensitive module component 300. The wireless charging device may actively or passively obtain the related information of the sensitive module component 300 from the charging module 301, and charge the terminal device 30 based on the obtained related information. In an example, during the passive obtaining, the charging module 301 sends an instruction to the wireless charging device in a wireless manner, where the instruction carries the related information of the sensitive module component 300. During the active obtaining, the wireless charging device sends, to the charging module 301 in a wireless manner, an instruction for requesting the related information. There may be an electrical connection or no electrical connection between the charging module 301 and the sensitive module component 300. When there is no electrical connection between the charging module 301 and the sensitive module component 300, the related information may be transmitted between the charging module 301 and the sensitive module component 300 by using a node file. This is described in detail in the following, and details are not described herein. A wireless communication manner of the charging module 301 and the wireless charging device may be wireless-fidelity (Wireless-Fidelity, Wi-Fi), Bluetooth (Bluetooth), zigbee (Zigbee), a long range (Long Range, Lora) wireless technology, near field communication (Near Field Communication, NFC), amplitude shift keying (Amplitude Shift Keying, ASK), frequency shift keying (Frequency Shift Keying, FSK), or the like.

The following describes the technical solutions in the embodiments of this application in detail with reference to the accompanying drawings in this specification and specific implementations. In the following descriptions, an example in which the technical solutions provided in the embodiments of this application are applied to an application scenario shown in FIG. 3 is used. An example in which the charging device 31 included in the application scenario is a wireless charging device is used.

Figure 4:
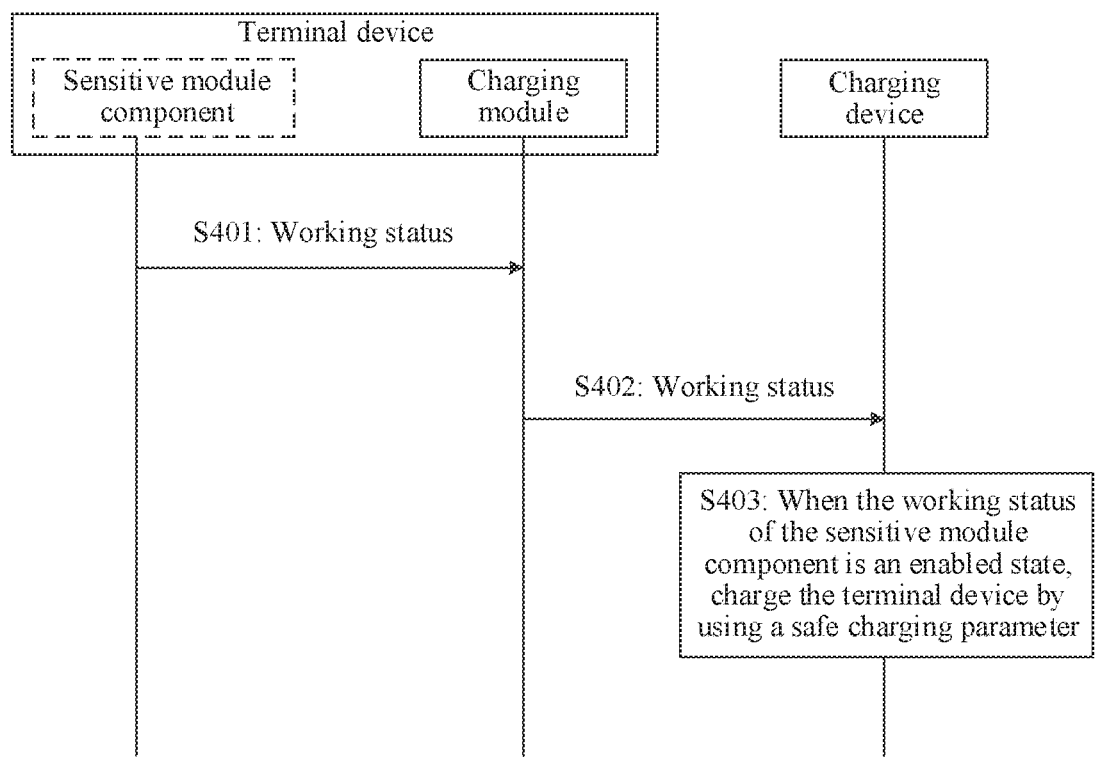
FIG. 4 is a flowchart of a charging method according to an embodiment of this application.

Referring to FIG. 4, an embodiment of this application provides a charging method. The charging method is applied to the terminal device 30. The terminal device 30 includes the sensitive module component 300 and the charging module 301. A process of the method is mainly described as follows:

S401: The charging module 301 obtains a working status of the sensitive component 300.

It should be noted that, that the charging module 301 obtains a working status of the sensitive component 300 may be that the charging module 301 receives the working status sent by the sensitive module component 300, or may be that the charging module 301 receives the working status sent by a processor (not shown in the figure) of the terminal device 30. In the following descriptions, that the charging module 301 receives the working status sent by the sensitive module component 300 is used as an example.

The sensitive module component 300 is a module component that is interfered with in a process in which the wireless charging device charges the terminal device 30 at a sensitive frequency. The sensitive frequency is within a range of a wireless charging frequency band. A Qi standard is used as an example herein. The wireless charging frequency band may be a frequency band $f_1$KHz-$f_2$KHz at 110 kHz to 205 kHz. The sensitive frequency may be one or more frequencies in $f_1$KHz-$f_2$KHz, or may be one or more frequency bands in $f_1$KHz-$f_2$KHz.

Figure 5:
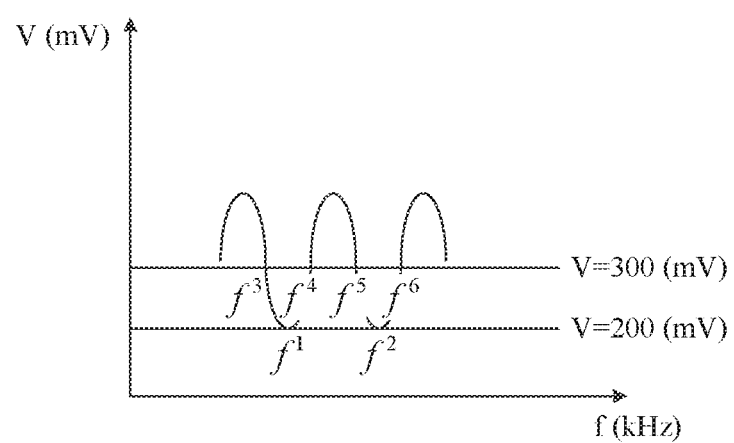
FIG. 5 is a waveform diagram of anti-interference of a camera module when a sensitive module component is the camera module according to an embodiment of this application.

The sensitive module component 300 may be an LCD, a TP, a camera module, a fingerprint module, an NFC, an audio module, a radio frequency module, or the like. The following uses an example in which the sensitive module component 300 is the camera module, to describe frequencies or frequency bands at which noise interference causes the camera module to be abnormal. FIG. 5 is a waveform diagram of anti-interference of a camera module. A horizontal axis represents frequency (KHz), and a vertical axis represents voltage (millivolt (mV)), which may be understood as noise. When a noise level is 200 mV, intersection points of the straight line whose V=200 mV and the waveform diagram are at troughs of the waveform diagram, and frequencies corresponding to the intersection points are $f^1$ and $f^2$. This indicates that the camera module becomes abnormal at the frequencies $f^1$ and $f^2$ when the noise level is 200 mV, and the camera module does not become abnormal at other frequencies when the noise level is 200 mV. When a noise level is 300 mV, frequencies corresponding to intersection points of a straight line whose V=300 mV and the waveform diagram are $f^3$, $f^4$, $f^5$, and $f^6$. This indicates that the camera module becomes abnormal in frequency bands $f^3$-$f^4$ and $f^5$-$f^6$ when the noise level is 300 mV, and the camera module does not become abnormal at other frequencies when the noise level is 300 mV.

The working status of the sensitive module component 300 includes an enabled state and a disabled state. The enabled state means that the sensitive module component 300 is in a running state, and the disabled state means that the sensitive module component 300 is in a non-running state. When the working status of the sensitive module component 300 is the enabled state, an enabling moment of the sensitive module component 300 may be in a process in which the wireless charging device charges the terminal device 30, or may be before the wireless charging device charges the terminal device 30.

In a specific implementation process, the sensitive module component 300 may send the working status to the charging module 301 in the following two manners, which are separately described below.

Manner 1: The sensitive module component 300 directly sends the working status of the sensitive module component 300 to the charging module 301.

In Manner 1, there may be an electrical connection between the sensitive module component 300 and the charging module 301. For example, an inter-integrated circuit (Inter-Integrated Circuit, I2C) bus interface on the sensitive module component 300 is connected to an I2C interface on the charging module 301 through an I2C bus. In this way, when the wireless charging device charges the terminal device 30, the sensitive module component 300 sends the working status to the charging module 301 through the I2C bus. In a specific implementation process, the sensitive module component 300 sends an indication instruction to the charging module 301 through the I2C bus. The indication instruction may be used to indicate the working status of the sensitive module component 300. For example, the sensitive module component 300 sends an indication instruction 0010 to the charging module 301 through the I2C bus, where the indication instruction 0010 may be used to indicate that the working status of the sensitive module component 300 is the enabled state. Alternatively, the sensitive module component 300 sends an indication instruction 1101 to the charging module 301 through the I2C bus, where the indication instruction 1101 may be used to indicate that the working status of the sensitive module component 300 is the disabled state.

It should be noted that the charging module 301 may actively obtain the working status of the sensitive module component 300 from the sensitive module component 300. For example, when the wireless charging device charges the terminal device 30, the charging module 301 sends, to the sensitive module component 300 through the I2C bus, an instruction for requesting to obtain the working status of the sensitive module component 300. After receiving the instruction, the sensitive module component 300 sends the working status to the charging module 301 through the I2C bus.

Manner 2: The charging module 301 obtains the working status of the sensitive module component 300 by using a node file.

In Manner 2, there may be an electrical connection or no electrical connection between the sensitive module component 300 and the charging module 301. In a specific implementation process, the charging module 301 may provide the node file. The node file may be understood as storage space provided by the charging module 301. The storage space may be storage space in the charging module 301, or may be storage space applied for by the charging module 301 to a memory (not shown in the figure) of the terminal device 30. The storage space may be divided into a plurality of storage subspaces. Each storage subspace corresponds to one storage address. Each storage address corresponds to one sensitive module component 300, and is used by the sensitive module component 300 to write information.

In the embodiments of this application, a quantity of sensitive module components 300 is not limited. There may be one or more sensitive module components 300. When there are a plurality of sensitive module components 300, there may be one or more sensitive module components 300 in an enabled state. In an example, the sensitive module components 300 include a sensitive module component A, a sensitive module component B, . . . , and a sensitive module component N. When the sensitive module component A and the sensitive module component B are in the enabled state, the sensitive module component A and the sensitive module component B write working statuses into the node file. The sensitive module component A writes, into corresponding storage subspace based on a storage address, 0x01 used to represent the sensitive module component A and 0xFE used to represent the working status of the sensitive module component A. The sensitive module component B writes, into corresponding storage subspace based on a storage address, 0x02 used to represent the sensitive module component B and 0xFD used to represent the working status of the sensitive module component B.

For the charging module 301, the charging module 301 may read content in the node file at a specific period, to determine whether new information is written into the node file, so as to parse the content stored in the node file. Specifically, the charging module 301 parses 0x01 to obtain the A, and parses 0xFE to obtain that the working status of the sensitive module component A is the enabled state. The charging module 301 parses 0x02 to obtain the B, and parses 0xFD to obtain that the working status of the sensitive module component B is the enabled state. After completing parsing, the charging module 301 may send information obtained through parsing to the wireless charging device, or may store information obtained through parsing in storage space. In an example, the enabled state of the A that is obtained through parsing is stored in a high bit (bit), and the enabled state of the B that is obtained through parsing is stored in a bit following the high bit. The enabled state may be represented by 1, and the disabled state may be represented by 0.

When the charging module 301 receives the working status sent by the sensitive module component 300, the sensitive module component 300 may send the working status to the charging module 301 or write the working status into the node file at a specific period. Alternatively, when the working status of the sensitive module component 300 changes, the sensitive module component 300 sends the working status to the charging module 301 or writes the working status into the node file. For example, when the working status of the sensitive module component 300 is adjusted from the enabled state to the disabled state, the sensitive module component 300 sends, to the charging module 301, the current working status which is the disabled state. Alternatively, when the working status of the sensitive module component 300 is adjusted from the disabled state to the enabled state, the sensitive module component 300 sends, to the charging module 301, the current working status which is the enabled state.

S402: The charging module 301 sends the working status of the sensitive module component 300 to the wireless charging device.

It should be noted that the wireless charging device may actively obtain the working status from the charging module 301. For example, the wireless charging device sends, to the charging module 301 in a wireless manner, an instruction for requesting to obtain the working status of the sensitive module component 300. After receiving the instruction, the charging module 301 may send the working status to the wireless charging device in a wireless manner.

In this embodiment of this application, the charging module 301 may directly transmit the working status to the wireless charging device in a wireless manner. Alternatively, the charging module 301 may send the working status to the wireless charging device in a wireless manner only when determining that the wireless charging device charges the terminal device 30. In this way, when the wireless charging device does not charge the terminal device 30, the charging module 301 is prevented from sending the working status to the wireless charging device. This reduces power consumption of the terminal device 30.

Figure 6A:
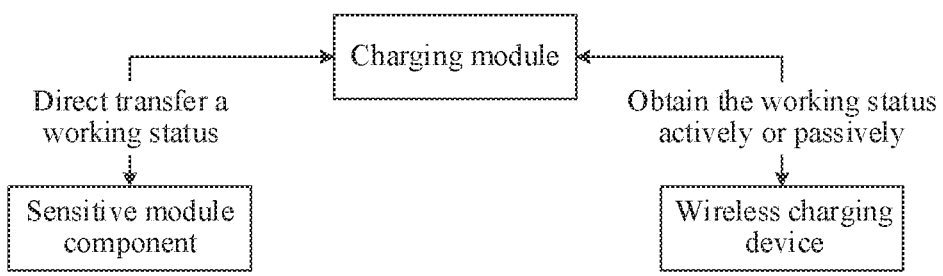
FIG. 6A and FIG. 6B are schematic diagrams of communication among a sensitive module component, a charging module, and a wireless charging device according to an embodiment of this application.
Figure 6B:
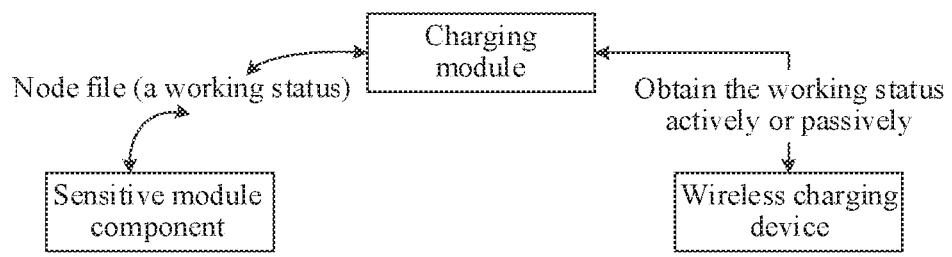

Based on the foregoing descriptions of step S401 and step S402, when the working status of the sensitive module component 300 is transferred between the sensitive module component 300 and the charging module 301 in Manner 1, for a communication process of the sensitive module component 300, the charging module 301, and the wireless charging device, refer to FIG. 6A. When the working status of the sensitive module component 300 is transferred between the sensitive module component 300 and the charging module 301 by using the node file in Manner 2, for a communication process of the sensitive module component 300, the charging module 301, and the wireless charging device, refer to FIG. CB, S403: When the working status of the sensitive module component 300 is the enabled state, the wireless charging device charges the terminal device 30 by using a safe charging parameter, where in a process in which the wireless charging device charges the terminal device 30 by using the safe charging parameter, the sensitive module component 300 operates normally.

It should be noted that the safe charging parameter includes at least one of a safe charging frequency, a safe charging voltage, or a safe charging current. The safe charging frequency is a frequency that does not cause interference to the sensitive module component 300 in the process in which the wireless charging device charges the terminal device 30. The safe charging voltage is a charging voltage that does not cause interference to the sensitive module component 300 in the process in which the wireless charging device charges the terminal device 30. The safe charging current is a charging current that does not cause interference to the sensitive 300 in the process in which the wireless charging device charges the terminal device 30.

That the sensitive module component 300 can operate normally means that after the sensitive module component 300 is enabled, a related function of the sensitive module component 300 can be implemented, and no abnormality occurs. For example, the sensitive module component 300 is a TP. When the TP is in an enabled state, the TP does not encounter an abnormal state in which touch sensitivity decreases. If the sensitive module component 300 is an LCD, when the LCD is in an enabled state, an abnormal state such as a color stripe or a ripple does not appear on the LCD. If the sensitive module component 300 is a fingerprint module component, when the fingerprint module component is in an enabled state, the fingerprint module component does not encounter an abnormal state in which fingerprint recognition sensitivity decreases. If the sensitive module component 300 is an NFC, when the NFC is in an enabled state, an abnormal state of communication interruption does not occur in the NFC. If the sensitive module component 300 is a camera module, when the camera module is in an enabled state, an abnormal state such as a color stripe or a ripple does not occur in a preview mode of a camera or a photographed picture.

In this embodiment of this application, the safe charging parameter may be obtained by the wireless charging device from the terminal device 30, or may be determined by the wireless charging device. The following provides separate description.

1. The safe charging parameter is obtained by the wireless charging device from the terminal device 30.

The sensitive module component 300 may be classified into two types of sensitive module components: an operating frequency that can be obtained and an operating frequency that cannot be obtained. The operating frequency that can be obtained means that the sensitive component 300 can obtain an operating frequency of the sensitive component 300. The operating frequency that cannot be obtained means that the sensitive component 300 cannot obtain an operating frequency of the sensitive component 300. The following separately describes processes in which the charging module 301 in the two types determines the safe charging parameter and sends the safe charging parameter to the wireless charging device when the sensitive module component 300 is in an enabled state.

(1) The sensitive module component 300 is a sensitive module component whose operating frequency can be obtained, for example, a TP, a fingerprint module, an LCD, an audio module, an NFC, and a radio frequency module.

In an example, the sensitive module component 300 learns of the operating frequency (that is, the sensitive frequency) of the sensitive module component 300, and sends the operating frequency of the sensitive component 300 to the charging module 301 in Manner 1 or Manner 2. The charging module 301 obtains the safe charging frequency based on the operating frequency. Herein, a process in which the charging module 301 obtains the safe charging frequency based on the operating frequency may be that the charging module 301 selects a frequency other than the operating frequency from the wireless charging frequency band as the safe charging frequency. The foregoing example continues to be used. It is assumed that the wireless charging frequency band is $f_1$ KHz-$f_2$ KHz, and the operating frequency is a single frequency $f_m$ kHz. In a specific implementation process, the wireless charging device selects another frequency other than the operating frequency $f_m$ from $f_1$ KHz-$f_2$ KHz as the safe charging frequency. For example, the determined safe charging frequency may be or [$f_1$, $f_m$), ($f_m$, $f_2$], or [$f_1$, $f_m$)-($f_m$, $f_2$], or may be a single frequency other than $f_m$ in the frequency band $f_1$ KHz-$f_2$ KHz. In an example, if $f_1$=120 KHz, $f_2$=150 KHz, and $f_m$=130 KHz, the determined safe charging frequency may be [120, 130), (130, 150], [120, 130)-(130, 150], 133 kHz, or 135 kHz.

The charging module 301 then obtains the safe charging voltage and/or the safe charging current based on a pre-stored first correspondence, that is, based on a pre-stored correspondence between the sensitive module component and the safe charging voltage and/or the safe charging current. Refer to Table 1, this table stores a safe charging voltage and/or a safe charging current of the charging device 31 when each sensitive module component 300 is in an enabled state.

TABLE 1

| Sensitive module component | Safe charging voltage and/or safe charging current |
| --- | --- |
| TP | 5 V |
| LCD | 1.5 A |
| ... | ... |
| NFC | 9 V and 2 A |

In a specific implementation process, different safe charging parameters may be preset for different sensitive module components 300 based on an actual requirement. For example, the safe charging voltage is preset for the TP, the safe charging current is preset for the LCD, and the safe charging voltage and the safe charging current are preset for the NFC.

It should be noted herein that the safe charging voltage and/or the safe charging current of the sensitive module component 300 may be alternatively obtained by the charging module 301 from the sensitive module component 300.

In another example, the sensitive module component 300 may alternatively obtain, based on a pre-stored correspondence between the sensitive module component and a safe charging frequency, a safe charging voltage, and/or a safe charging current, a safe charging frequency, a safe charging voltage, and/or a safe charging current corresponding to the sensitive module component 300.

(2) The sensitive module component 300 is a sensitive module component whose operating frequency cannot be obtained, for example, a camera module.

In an example, the charging module 301 needs to obtain the safe charging frequency, the safe charging voltage, and/or the safe charging current based on a pre-stored second correspondence, that is, a pre-stored correspondence between the sensitive module component and a safe charging frequency, a safe charging voltage, and/or a safe charging current. Refer to Table 2, this table stores a safe charging frequency, a safe charging voltage, and/or a safe charging current of the charging device 31 when each sensitive module component 300 is in an enabled state.

TABLE 2

| Sensitive module component | Safe charging frequency, safe charging voltage, and/or safe charging current |
| --- | --- |
| Camera module | 130 kHz, 9 V, and 2 A |

In a specific implementation process, the camera module has a relatively large quantity of sensitive frequencies and is also relatively sensitive to a noise. Consequently, all of the safe charging frequency, the safe charging voltage, and the safe charging current usually need to be set, or both the safe charging frequency and the safe charging voltage need to be set, or both the safe charging frequency and the safe charging current need to be set. In this example, the correspondence between the sensitive module component and the safe charging parameter may be stored in the charging module 301 in a form of a table or in a form of a file.

In another example, the charging module 301 needs to obtain, based on a pre-stored correspondence between the sensitive module component and a sensitive frequency, a safe charging voltage, and/or a safe charging current, a sensitive frequency, a safe charging voltage, and/or a safe charging current corresponding to the sensitive module component 300. Then, the charging module 301 determines the safe charging frequency based on the sensitive frequency of the sensitive module component 300 in an enabled state.

It should be noted herein that the safe charging frequency/sensitive frequency, the safe charging voltage, and/or the safe charging current may be alternatively obtained by the charging module 301 from the sensitive module component 300.

In a specific implementation process, a correspondence between a plurality of sensitive module components and a safe charging voltage and/or a safe charging current may be further pre-stored in Table 1. A correspondence between a plurality of sensitive module components and a safe charging frequency, a safe charging voltage, and/or a safe charging current may be further pre-stored in Table 2. In an example that the correspondence between a plurality of sensitive module components and a safe charging frequency, a safe charging voltage, and/or a safe charging current is pre-stored in Table 2, before pre-storage, the charging module 301 needs to first determine a safe charging frequency, a safe charging voltage, and/or a safe charging current of a plurality of sensitive module components 300.

A. The safe charging frequency of the plurality of sensitive module components 300 is determined.

A safe operating frequency of the plurality of sensitive module components 300 may be an intermediate frequency of safe charging frequencies of the plurality of sensitive module components 300. The intermediate frequency herein may be understood as an intermediate value of the safe charging frequencies of the plurality of sensitive module components 300. When the wireless charging device charges the terminal device 30 at an operating frequency corresponding to the intermediate value, the wireless charging device still causes interference to the plurality of sensitive module components, but the interference is within an acceptable range. The foregoing example continues to be used. The wireless charging frequency band is $f_1 KHz$-$f_2 KHz$, the sensitive module components 300 are the sensitive module component A and the sensitive module component B. When a safe charging frequency of the sensitive module component A is $f_{mA}$, and a safe charging frequency of the sensitive module component B is $f_{mB}$, the safe charging frequency of the sensitive module component A and the sensitive module component B may be an intermediate frequency $f_z$ of $f_{mA}$ and $f_{mB}$. In an example, when $f_{mA}=140$ KHz and $f_{mA}=135$ KHz, $f_z=138$ KHz. In this case, the safe charging frequency of the sensitive module component A and the sensitive module component B is 138 kHz.

B. The safe charging current of the plurality of sensitive module components 300 is determined.

The safe charging current of the plurality of sensitive module components 300 may be a minimum charging current in safe charging currents of the plurality of sensitive module components 300. The foregoing example continues to be used. The sensitive module components 300 are the sensitive module component A and the sensitive module component B. When a safe charging current of the sensitive module component A is 2 A, and a safe charging current of the sensitive module component B is 3 A, a minimum charging current in 2 A and 3 A is used as the safe charging current of the sensitive module component A and the sensitive module component B.

C. The safe charging voltage of the plurality of sensitive module components 300 is determined.

The safe charging voltage of the plurality of sensitive module components 300 may be a minimum charging voltage in safe charging voltages of the plurality of sensitive module components 300. The foregoing example continues to be used. The sensitive module components 300 are the sensitive module component A and the sensitive module component B. When a safe charging voltage of the sensitive module component A is 10 V, and a safe charging voltage of the sensitive module component B is 9 V, a minimum charging voltage in 10 V and 9 V is used as the safe charging voltage of the sensitive module component A and the sensitive module component B.

D. The safe charging frequency and the safe charging voltage of the plurality of sensitive module components 300 are determined. For this process, refer to determining processes in A and C. Details are not described herein.

E. The safe charging frequency and the safe charging current of the plurality of sensitive module components 300 are determined. For this process, refer to determining processes in A and B. Details are not described herein.

F. The safe charging voltage and the safe charging current of the plurality of sensitive module components 300 are determined. For this process, refer to determining processes in B and C. Details are not described herein.

G. The safe charging frequency, the safe charging current, and the safe charging voltage of the plurality of sensitive module components 300 are determined. For this process, refer to determining processes in A, B, and C. Details are not described.

After the charging module 301 determines the safe charging frequency, the safe charging voltage, and/or the safe charging current of the sensitive module component 300, the charging module 301 sends the obtained safe charging frequency, the obtained safe charging voltage, and/or the obtained safe charging current of the sensitive component to the wireless charging device. The parameters may be sent one by one, or a plurality of parameters may be sent together. This is not specifically limited in the embodiments of this application.

It should be noted herein that when there are a plurality of sensitive module components 300, the charging module 301 further needs to obtain identification information of the sensitive module components 300 from the sensitive module components 300 in an active or passive manner. The identification information may be a digit, a letter, a combination of a digit and a letter, or a combination of a digit, a letter, and a character. The sensitive module component A and the sensitive module component B are still used as an example, identification information of the sensitive module component A may be represented as 1, and identification information of the sensitive module component B may be represented as 2. Herein, a process in which the charging module 301 obtains the identification information from the sensitive module components 300 in an active or passive manner is similar to a process in which the charging module 301 obtains the working status from the sensitive module component 300 in an active or passive manner. Details are not described herein.

It should be noted herein that when the correspondence between a plurality of sensitive module components and a safe charging voltage and/or a safe charging current is not pre-stored in Table 1, and the correspondence between a plurality of sensitive module components and a safe charging frequency, a safe charging voltage, and/or a safe charging current is not pre-stored in Table 2, the charging module

301 may alternatively search Table 1 and Table 2 for a respective safe charging parameter of the sensitive module components 300, determine the safe charging parameter of the plurality of sensitive module components 300 based on the respective safe charging parameter, and finally send the safe charging parameter to the wireless charging device.

2. The safe charging parameter is determined by the wireless charging device.

Manners in which the wireless charging device determines the safe charging parameter include but are not limited to the following two manners. A first implementation is similar to a process in which the charging module 301 determines the safe charging parameter. Details are not described herein. In a second manner, the charging module 301 sends parameter information of the sensitive module component 300 that is preset by the charging module 301 or obtained from the sensitive module component 300 to the wireless charging device, and the wireless charging device determines the safe charging parameter. Details are described below.

When the sensitive module component 300 is in different types, there are also different processes in which the charging module 301 sends the parameter information to the wireless charging device. The following separately describes the processes.

(1) The sensitive module component 300 is a sensitive module component whose operating frequency can be obtained, for example, a TP, a fingerprint module, an LCD, an audio module, an NFC, and a radio frequency module.

In an example, the sensitive module component 300 learns of the operating frequency of the sensitive module component 300, and sends the operating frequency of the sensitive component 300 to the charging module 301. Then, the charging module 301 obtains, based on a pre-stored correspondence between the sensitive module component and a safe charging voltage and/or a safe charging current, a safe charging voltage and/or a safe charging current corresponding to the sensitive module component 300. The charging module 301 sends the operating frequency, the safe charging voltage, and/or the safe charging current of the sensitive module component 300 to the wireless charging device.

It should be noted that the safe charging voltage and/or the safe charging current may be alternatively obtained by the charging module 301 from the sensitive module component 300.

In another example, the charging module 301 may alternatively obtain the safe charging frequency, a charging voltage of the terminal device 30, and/or a charging current of the terminal device 30 based on a pre-stored correspondence between the sensitive module component and the safe charging frequency, the charging voltage of the terminal device 30, and/or the charging current of the terminal device 30. The charging module 301 sends the safe charging frequency, the charging voltage of the terminal device 30, and/or the charging current of the terminal device 30 to the wireless charging device. The charging voltage of the terminal device 30 may be understood as a charging voltage that the sensitive module component 300 requires the terminal device 30 to meet in the process in which the wireless charging device charges the terminal device 30. The charging current of the terminal device 30 may be understood as a charging current that the sensitive module component 300 requires the terminal device 30 to meet in the process in which the wireless charging device charges the terminal device 30.

It should be noted that the safe charging frequency, the charging voltage of the terminal device 30, and/or the charging current of the terminal device 30 may be alternatively obtained by the charging module 301 from the sensitive module component 300.

(2) The sensitive module component 300 is a sensitive module component whose operating frequency cannot be obtained, for example, a camera module.

In an example, the charging module 301 needs to obtain, based on a pre-stored correspondence between the sensitive module component and the sensitive frequency, a safe charging voltage, and/or a safe charging current, a sensitive frequency, a safe charging voltage, and/or a safe charging current corresponding to the sensitive module component 300. The charging module 301 sends the sensitive frequency, the safe charging voltage, and/or the safe charging current to the wireless charging device.

It should be noted that the sensitive frequency, the safe charging voltage, and/or the safe charging current may be alternatively obtained by the charging module 301 from the sensitive module component 300.

In another example, the sensitive module component needs to obtain, based on a pre-stored correspondence between the sensitive module component and the safe charging frequency, a charging voltage of the terminal device 30, and/or a charging current of the terminal device 30, a safe charging frequency corresponding to the sensitive module component 300, the charging voltage of the terminal device 30 and/or the charging current of the terminal device 30.

It should be noted that the safe charging frequency, the charging voltage of the terminal device 30, and/or the charging current of the terminal device 30 may be obtained by the charging module 301 from the sensitive module component 300.

Correspondingly, when the charging module 301 sends different requirements of charging parameters to the wireless charging device, there are different processes in which the wireless charging device determines the safe charging parameter. The following separately describes the processes.

Case 1: The charging module 301 sends the sensitive frequency, the safe charging voltage, and/or the safe charging current to the wireless charging device.

The wireless charging device needs to determine the safe charging frequency based on the sensitive frequency of the sensitive module component 300. A determining process herein is similar to a process in which the charging module 301 determines the safe charging frequency based on the operating frequency of the sensitive module component 300. Details are not described herein.

If there are a plurality of sensitive module components 300 in an enabled state, the wireless charging device further needs to determine a safe charging parameter of the plurality of sensitive module components 300 in the enabled state. This process is similar to a process in which the charging module 301 determines the safe charging parameter of the plurality of sensitive module components 300. Details are not described herein.

It should be noted herein that when there are the plurality of sensitive module components 300 in the enabled state, the wireless charging device may alternatively select, from the wireless charging frequency band, a frequency other than a sensitive frequency of the plurality of sensitive module components 300 in the enabled state as the safe charging frequency.

Case 2: The charging module 301 sends the safe charging frequency, the charging voltage of the terminal device 30, and/or the charging current of the terminal device 30 to the wireless charging device.

The wireless charging device needs to convert the charging voltage of the terminal device 30 into the safe charging voltage, so that charging power of the wireless charging device can meet a charging requirement of the terminal device 30. For example, the charging voltage of the terminal device 30 is 5 V, and the wireless charging device needs to convert 5 V into 9 V. For a process in which the wireless charging device converts 5 V into 9 V, refer to a conversion process in which the charging voltage of the terminal device 30 is converted into a charging voltage of the wireless charging device in the prior art. Details are not described herein.

The wireless charging device needs to convert the charging current of the terminal device 30 into the safe charging current, so that charging power of the wireless charging device can meet a charging requirement of the terminal device 30. For example, the second required charging current is 0.2 A, and the wireless charging device needs to convert 0.2 A into 2 A. For a conversion process in which the wireless charging device converts 0.2 A into 2 A, refer to a conversion process in which the charging current of the terminal device 30 is converted into a charging current of the wireless charging device in the prior art. Details are not described herein.

When there are a plurality of sensitive module components 300 in an enabled state, the wireless charging device needs to determine a safe charging parameter of the sensitive module components 300 in the enabled state. This process is similar to a process in which the charging module 301 determines the safe charging parameter of the plurality of sensitive module components 300. Details are not described herein.

Certainly, in this embodiment of this application, the charging module 300 may alternatively send the sensitive frequency, the charging voltage of the terminal device 30, and/or the charging current of the terminal device 30 to the wireless charging device. In this case, for a process in which the wireless charging device determines the safe charging parameter, refer to Case 1 and Case 2. Details are not described herein.

After determining the safe charging parameter, the wireless charging device may charge the terminal device 30 by using the safe charging parameter.

It should be noted herein that the charging method provided above can also be applied to wired charging, and details are not described herein.

The following describes, with reference to the accompanying drawings, the apparatuses provided in the embodiments of this application, to implement the foregoing method embodiments of this application.

Figure 7:
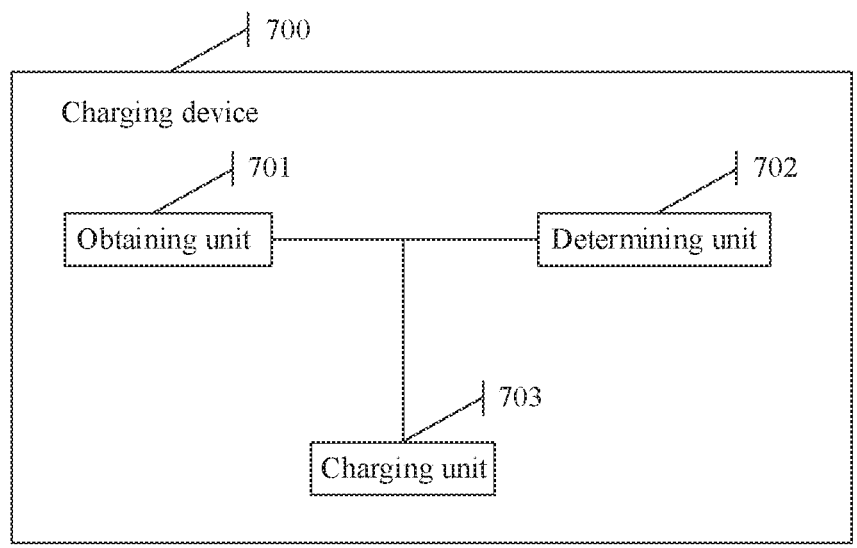
FIG. 7 is a schematic structural diagram of a charging device according to an embodiment of this application.

FIG. 7 is a schematic structural diagram of a charging device 700. The charging device 700 may include an obtaining unit 701, a determining unit 702, and a charging unit 703. The obtaining unit 701 may be configured to perform S401 in the embodiment shown in FIG. 4, and/or configured to support another process of the technology described in the embodiments of this application. The determining unit 702 and the charging unit 703 may be configured to perform S403 in the embodiment shown in FIG. 4, and/or configured to support another process of the technology described in the embodiments of this application. All related content of the steps in the foregoing method embodiments may be cited in function descriptions of the corresponding functional modules. Details are not described herein.

Figure 8:
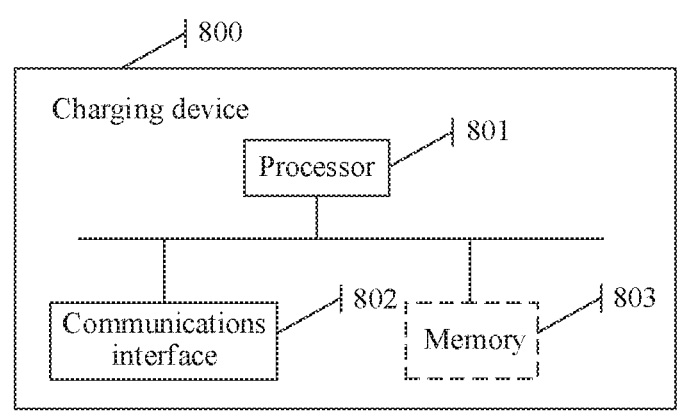
FIG. 8 is a schematic structural diagram of another charging device according to an embodiment of this application.

FIG. 8 is a schematic structural diagram of a charging device 800. The charging device 800 may include a processor 801, a communications interface 802, and a memory 803. The communications interface 802 and the memory 803 are coupled to the processor 801. The processor 801 may be a central processing unit (central processing unit, CPU), or an application-specific integrated circuit (application-specific integrated circuit, ASIC), or may be one or more integrated circuits configured to control program execution, or may be a baseband chip, or the like. There may be one or more memories. The memory may be a read-only memory (read-only memory, ROM), a random access memory (random access memory, RAM), a magnetic disk memory, or the like.

By designing and programming the processor 801, code corresponding to the foregoing charging method may be solidified into a chip, so that the chip can perform, when running, a function performed by the charging device in the charging method provided in the embodiment shown in FIG. 4. How to design and program the processor 801 is a technology well known to a person skilled in the art. Details are not described herein.

Figure 9:
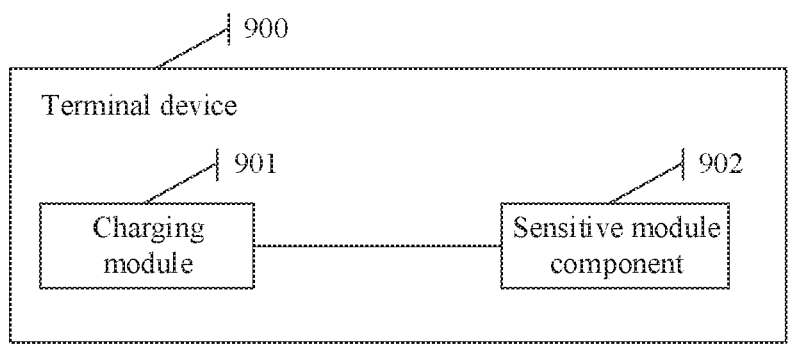
FIG. 9 is a schematic structural diagram of a terminal device according to an embodiment of this application.

FIG. 9 is a schematic structural diagram of a terminal device 900. The terminal device may include a charging module 901 and a sensitive module component 902. The charging module 901 and the sensitive module component 902 may be configured to perform S402 in the embodiment shown in FIG. 4, and/or configured to support another process of the technology described in the embodiments of this application.

An embodiment of this application further provides a computer storage medium. The storage medium may include a memory. The memory may store a program. When the program is executed, all steps performed by the charging device 800 and the terminal device 900 recorded in the method embodiment shown in FIG. 4 are performed.

An embodiment of this application further provides a computer program product. When the program product is invoked and executed by a computer, the computer may be enabled to perform the method provided in the method embodiment shown in FIG. 4.

An embodiment of this application further provides a chip system. The chip system includes a processor, configured to support the charging device 31 and the terminal device 30 in implementing the method provided in the embodiment shown in FIG. 4, for example, generating or processing data and/or information in the method provided in the embodiment shown in FIG. 4. The chip system further includes a memory. The memory is configured to store a program instruction and data that are necessary for the charging device 31 and the terminal device 30. The processor in the chip system may invoke the program instruction and the data stored in the memory in the chip system, so that the chip system can implement functions that can be implemented by the charging device and the terminal device. The chip system may include a chip, or may include a chip and another discrete device.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It is clearly that a person skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A charging method applied to a terminal device, wherein the charging method comprises:
    obtaining, by a sensitive component of the terminal device, a working status of the sensitive component, wherein the sensitive component interferes with a process in which a charging device charges the terminal device at a sensitive frequency, and wherein the sensitive frequency is within a range of a charging frequency band of the charging device;
    writing, by the sensitive component, the working status into a node file;
    sending, by the sensitive component, the working status to a charging system of the terminal device;
    obtaining, by the charging system, the working status from the node file;
    determining, by the charging system, a safe charging parameter when the working status is an enabled state, wherein the safe charging parameter comprises at least one of a safe charging frequency, a safe charging current, or a safe charging voltage;
    sending, by the charging system, the safe charging parameter to the charging device to enable the charging device to charge the terminal device using the safe charging parameter, wherein the sensitive component operates in a normal state when the charging device charges the terminal device using the safe charging parameter;
    obtaining, by the sensitive component, an operating frequency of the sensitive component, wherein the operating frequency is the sensitive frequency;
    sending, by the sensitive component, the operating frequency to the charging system;
    selecting, by the charging system and from the charging frequency band, a frequency other than the operating frequency as the safe charging frequency; and
    determining, by the charging system, the safe charging voltage or the safe charging current based on a pre-stored first mapping relationship, wherein the pre-stored first mapping relationship comprises a correspondence between the sensitive component and the safe charging voltage when the sensitive component is in the enabled state.

2. The charging method of claim 1, further comprising determining, by the charging system based on a pre-stored second mapping relationship, a safe charging frequency, a safe charging voltage, or a safe charging current that corresponds to the sensitive component, wherein the pre-stored second mapping relationship comprises a correspondence between the sensitive component and at least one of the safe charging frequency, the safe charging voltage, or the safe charging current when the sensitive component is in the enabled state.

3. The charging method of claim 1, further comprising determining, by the charging system, an intermediate frequency of safe charging frequencies corresponding to a plurality of sensitive components as the safe charging frequency when the sensitive components are in the enabled state.

4. The charging method of claim 1, further comprising determining, by the charging system, a minimum charging voltage in safe charging voltages corresponding to a plurality of sensitive components as the safe charging voltage when the sensitive components are in the enabled state.

5. The charging method of claim 1, further comprising determining, by the charging system, a minimum charging current in safe charging currents corresponding to a plurality of sensitive components as the safe charging current when the sensitive components are in the enabled state.

6. The charging method of claim 1, further comprising determining, by the charging system based on a pre-stored second mapping relationship, a safe charging frequency that corresponds to the sensitive component, wherein the pre-stored second mapping relationship comprises a correspondence between the sensitive component and the safe charging frequency when the sensitive component is in the enabled state.

7. The charging method of claim 1, further comprising determining, by the charging system based on a pre-stored second mapping relationship, a safe charging voltage that corresponds to the sensitive component, wherein the pre-stored second mapping relationship comprises a correspondence between the sensitive component and the safe charging voltage when the sensitive component is in the enabled state.

8. The charging method of claim 1, further comprising determining, by the charging system based on a pre-stored second mapping relationship, a safe charging current that corresponds to the sensitive component, wherein the pre-stored second mapping relationship comprises a correspondence between the sensitive component and the safe charging current when the sensitive component is in the enabled state.

9. A terminal device comprising:
a sensitive component configured to interfere with a process in which a charging device charges the terminal device at a sensitive frequency, wherein the sensitive frequency is within a range of a charging frequency band of the charging device; and
a processor coupled to the sensitive component and configured to:
obtain a working status of the sensitive component;
write the working status into a node file;
obtain the working status from the node file;
determine a safe charging parameter when the working status is an enabled state, wherein the safe charging parameter comprises at least one of a safe charging frequency, a safe charging current, or a safe charging voltage;
send the safe charging parameter to the charging device to enable the charging device to charge the terminal device using the safe charging parameter, wherein the sensitive component operates in a normal state when the charging device charges the terminal device using the safe charging parameter;
obtain an operating frequency of the sensitive component, wherein the operating frequency is the sensitive frequency;
select, from the charging frequency band, a frequency other than the operating frequency as the safe charging frequency; and
determine the safe charging voltage or the safe charging current based on a pre-stored first mapping relationship, wherein the pre-stored first mapping relationship comprises a correspondence between the sensitive component and the safe charging voltage when the sensitive component is in the enabled state.

10. The terminal device of claim 9, wherein the processor is further configured to determine, based on a pre-stored second mapping relationship, the safe charging frequency, the safe charging voltage, or the safe charging current that corresponds to the sensitive component, and wherein the pre-stored second mapping relationship comprises a correspondence between the sensitive component and at least one of the safe charging frequency, the safe charging voltage, or the safe charging current when the sensitive component is in the enabled state.

11. The terminal device of claim 9, wherein the processor is further configured to determine a minimum charging voltage in safe charging voltages corresponding to a plurality of sensitive components as the safe charging voltage when the sensitive components are in the enabled state.

12. The terminal device of claim 9, wherein the processor is further configured to determine an intermediate frequency of safe charging frequencies corresponding to a plurality of sensitive components as the safe charging frequency when the sensitive components are in the enabled state.

13. The terminal device of claim 9, wherein the processor is further configured to determine a minimum charging current in safe charging currents corresponding to a plurality of sensitive components as the safe charging current when the sensitive components are in the enabled state.

14. The terminal device of claim 9, wherein the sensitive component comprises a touch panel.

15. The terminal device of claim 9, wherein the sensitive component comprises a camera module.

16. A computer program product comprising computer-executable instructions for storage on a non-transitory computer readable storage medium that, when executed by a processor, cause a terminal device to:
obtain a working status of a sensitive component of the terminal device, wherein the sensitive component interferes with a process in which a charging device charges the terminal device at a sensitive frequency, and wherein the sensitive frequency is within a range of a charging frequency band of the charging device;
write the working status into a node file;
obtain the working status from the node file;
determine a safe charging parameter when the working status is an enabled state, wherein the safe charging parameter comprises at least one of a safe charging frequency, a safe charging current, or a safe charging voltage;
send the safe charging parameter to the charging device to enable the charging device to charge the terminal device using the safe charging parameter, wherein the sensitive component operates in a normal state when the charging device charges the terminal device using the safe charging parameter;
obtain an operating frequency of the sensitive component, wherein the operating frequency is the sensitive frequency;
select, from the charging frequency band, a frequency other than the operating frequency as the safe charging frequency; and
determine the safe charging voltage or the safe charging current based on a pre-stored first mapping relationship, wherein the pre-stored first mapping relationship comprises a correspondence between the sensitive component and at least one of the safe charging voltage or the safe charging current when the sensitive component is in the enabled state.

17. The computer program product of claim 16, wherein the computer-executable instructions further cause the terminal device to determine, based on a pre-stored second mapping relationship, the safe charging frequency, the safe charging voltage, or the safe charging current that corresponds to the sensitive component, and wherein the pre-stored second mapping relationship comprises a correspondence between the sensitive component and at least one of the safe charging frequency, the safe charging voltage, or the safe charging current when the sensitive component is in the enabled state.

18. The computer program product of claim 16, wherein the computer-executable instructions further cause the terminal device to determine a minimum charging voltage in safe charging voltages corresponding to a plurality of sensitive components as the safe charging voltage.

19. The computer program product of claim 16, wherein the computer-executable instructions further cause the terminal device to determine an intermediate frequency of safe charging frequencies corresponding to a plurality of sensitive components as the safe charging frequency.

20. The computer program product of claim 16, wherein the computer-executable instructions further cause the terminal device to determine a minimum charging current in safe charging currents corresponding to a plurality of sensitive components as the safe charging current.

* * * * *